UNITED STATES PATENT OFFICE.

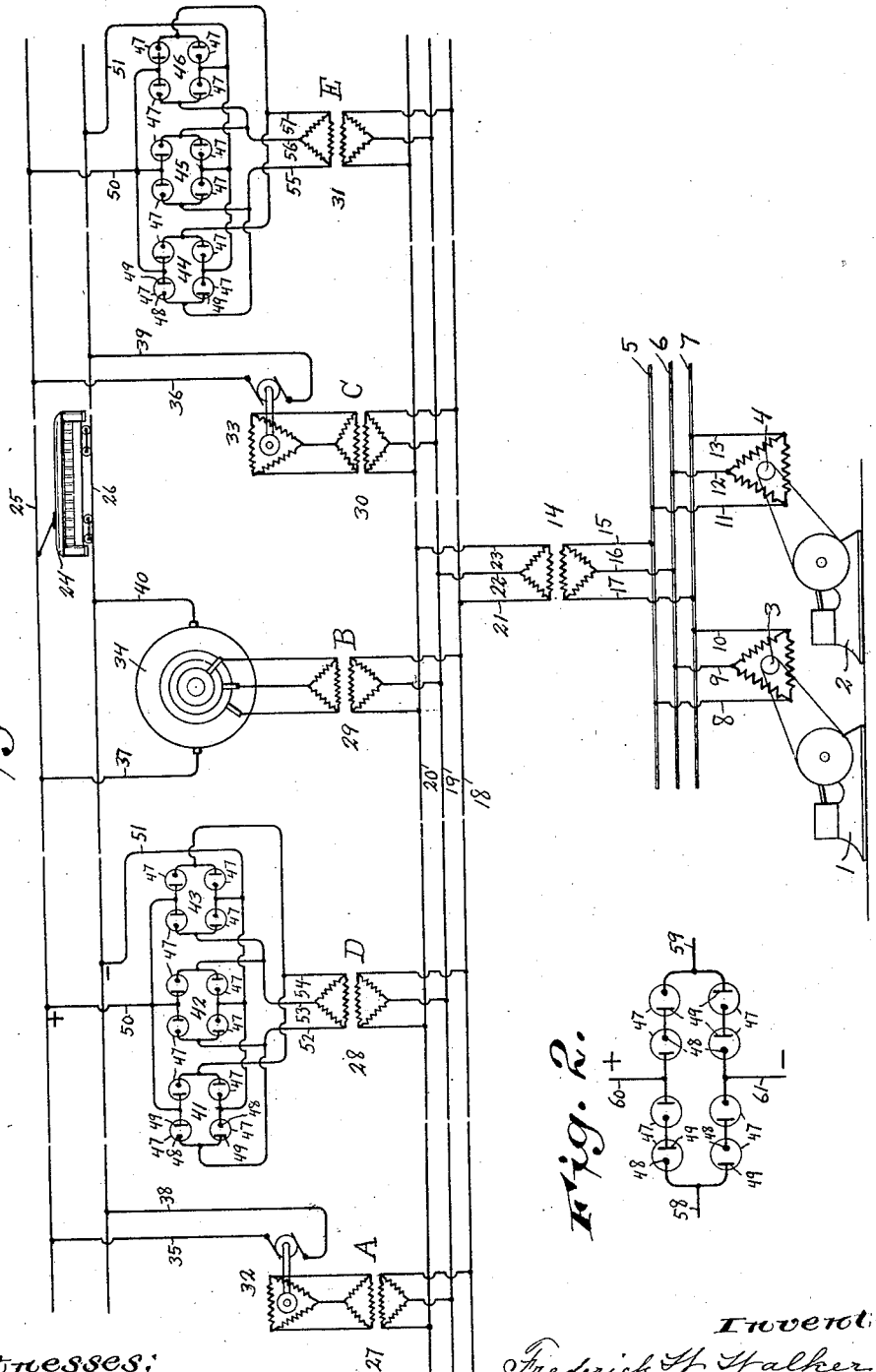

FREDERICK W. WALKER, OF PORT WASHINGTON, WISCONSIN.

BOOSTER SYSTEM.

1,335,541.  Specification of Letters Patent.  Patented Mar. 30, 1920.

Application filed August 5, 1914. Serial No. 855,094.

*To all whom it may concern:*

Be it known that I, FREDERICK W. WALKER, a citizen of the United States, residing at Port Washington, in the county of Ozaukee and State of Wisconsin, have invented certain new and useful Improvements in Booster Systems, of which the following is a specification, reference being had to the accompanying drawing, forming a part thereof.

The objects of this invention are to boost the electrical potential, or voltage, in electrical circuits by supplying additional electrical energy automatically to such circuits on the lowering of the potential, or voltage, therein by a demand for current. This invention may be advantageously applied to power circuits, light circuits, transportation circuits, or any combination of such circuits, or to any single machine or apparatus which uses electrical energy. For convenience of illustration and simplicity of description I have illustrated and shall describe the invention as applied to a direct current, transportation system provided with a three-phase, alternating current transmission line, but by such illustration and description I do not limit myself to that specific application of the invention. This specific adaptation and use of the invention is merely selected for illustration and description because the working problems involved will be readily understood and the advantages of the invention as applied to these particular problems will be readily appreciated.

Referring to the drawings which accompany this specification and form a part hereof, on which drawings the same reference characters are used to designate the same elements wherever they may appear in the several views, and which drawings illustrate an embodiment of this invention, Figure 1 is a diagrammatic illustration of an electrical transportation system; and Fig. 2 is a diagrammatic illustration of a unit of the booster system in a modified form.

In modern electrical transportation practice, as in interurban trolley lines, for example, it is common practice to use direct current motors on the cars and generate alternating current at the power stations. The alternating current is transmitted along the right of way and, at suitable intervals of space and by suitable apparatus, is used to supply direct current to the trolley line and distributing system. Step up and step down transformers are employed to obtain the proper voltages for transmission and use and, heretofore, for mechanical and electrical reasons, mechanical transformers provided with movable parts have been the sole available means for transforming or converting the alternating current into direct current for the purposes required. Transformers or converters provided with movable parts are expensive and require practically constant attendance. The substations or transformer stations, which contain transformers or converters provided with movable parts, on such transportation lines, are spaced apart according to conditions of service and if they are too numerous the outlay is excessive, too much capital is tied up in the investment and the cost of attendance is excessive. On the other hand, if the substations are spaced too far apart, the efficiency of the system is seriously impaired. Electrical engineers have long been striving to evolve some practical system for overcoming the defects of the present systems but I believe that I am the first one to invent a practical system for this purpose. I employ known forms of transformers or converters provided with movable parts for supplying direct current at the necessary voltage. For supplying additional direct current, when the voltage drops in the trolley line, I interpose between the transmission wires and the trolley line and distributing system a rectifier or converter without movable parts. At present I prefer to use an electrolytic rectifier or converter the characteristics of which will permit the passage of electricity from the transmission wires to the trolley line and distributing system but will not permit the passage of electricity from the trolley line and distributing system to the transmission wires. Such a rectifier or converter does not boost or elevate the normal voltage in the trolley line and the distributing system but acts to prevent excessive drop in the voltage in the trolley line and distributing system by supplying additional current thereto when the voltage upon same drops. The power station, or stations, must have generating capacity enough to supply the total current required and this is the case with all properly designed and constructed power plants. The difficulty is to supply sufficient substations or transformer stations, having transformers or converters provided with movable parts, to properly insure any part or section of the trolley line and distributing system receiving all of the current which it may require at a reasonable cost.

Referring now to the drawings, the reference numerals 1 and 2 designate power units for driving the three-phase, alternating current generators 3 and 4 in a main power plant or generating station. The generators are connected with the buss bars 5, 6 and 7 by the wires 8, 9 and 10, and 11, 12 and 13 respectively. The buss bars 5, 6 and 7 are connected with a step up transformer 14 by the wires 15, 16 and 17, and transformer 14 is connected to the transmission wires 18, 19 and 20 by the wires 21, 22 and 23. The reference numeral 24 designates a trolley car, 25 the trolley wire and 26 the return wire or rails. The reference letters A, B and C designate substations for supplying direct current to the trolley wire 25, or sections thereof. These substations are generally located several miles apart and the drawings show the transmission wires 18, 19 and 20, the trolley wire 25 and the return wire or rails 26 as broken away so that the several substations can be shown to a good sized scale on the sheet. It will, of course, be understood that in practice the transmission wires are continuous and that the trolley wire and the return wire may either be continuous or separated into blocks in the ordinary manner. The reference letters D and E designate booster stations. Booster station D is shown as located between substations A and B while booster station E is shown as located near the end of the line. Booster stations may be located wherever they may be required by service conditions but the two illustrated are sufficient for a full understanding of this invention. Step down transformers 27, 28, 29 30 and 31 are provided at each substation with their primary windings connected with the transmission wires 18, 19 and 20 by the usual three-wire connections and having the usual three-wire leads connecting with their secondary windings which in stations A and C supply current to the three-phase alternating current motors of the motor generators 32 and 33 and which in station B supply current to the rotary transformer 34. I have illustrated both motor generators and a rotary transformer simply to show that any suitable electrical apparatus can be used for these parts of the system. The motor generators and the rotary transformer supply direct current to the trolley wire 25 through the wires 35, 36 and 37 and are electrically connected with the return wire or rails 26 by the wires 38, 39 and 40 in the ordinary manner.

Each unit of the booster system is illustrated as composed of four cells and the units are designated by the reference numerals 41, 42, 43, 44, 45 and 46. The cells may be formed in any suitable or preferred manner and for simplicity of illustration I have illustrated the cells in a conventional manner as composed of a glass jar 47, or other suitable receptacle, containing borax dissolved in water, in which solution is a lead electrode 48 and an aluminum electrode 49. One or the other of the electrodes may be formed as the receptacle after the plan of an ordinary dry battery cell, and I do not limit the cells to any specific construction. The aluminum electrodes are provided with a film or coating of hydroxid of aluminum and the positive direct current wires 50 are connected with the aluminum electrodes, or plates, of two cells of each unit, and the negative direct current wires 51 are connected with the lead electrodes of the other two cells of each unit. The alternating current wires 52, 53 and 54 from the step down transformer 28 are each connected both to a lead and to an aluminum electrode of two of the cells of each unit, as clearly shown by the drawings. Wire 52 is connected with units 41 and 42. Wire 53 is connected with units 42 and 43 and wire 54 is connected with units 41 and 43, as clearly shown by the wiring diagrams. In the same way the wires 55, 56 and 57 from the step down transformer 31 are each connected both with a lead and an aluminum electrode of two cells of a unit. Wire 55 is connected with units 44 and 45. Wire 56 is connected with units 45 and 46, and wire 57 is connected with units 44 and 46.

Fig. 2 of the drawings illustrates a modified form of grouping the cells of a unit in which the cells are arranged in series of two cells between each alternating current wire 58 and 59 and the direct current wires 60 and 61. By arranging the cells in series of two or more in the units as illustrated by Fig. 2 of the drawings the units can be built up to rectify or convert alternating current of potential or voltage demanded by any or all direct current distributing systems.

While I have described the cells as filled with a solution of borax and as having lead and aluminum electrodes, I do not limit the invention to that specific solution or to those specific electrodes, but that solution and those electrodes are the best and most efficient now known to me for the purposes of this invention.

The operation of the system is as follows: The motor generators 32 and 33 and the rotary transformer 34 supply current at substantially fixed and definite voltages to the trolley line and distributing system. This current is direct current. The voltage of this current drops as the distance from a transformer or converter station increases due to the resistance or impedance of the wire when a demand is made upon the trolley line for current by a trolley car, for example. When a drop in voltage from the predetermined voltage is manifested in the trolley line at a booster station current immediately flows from the transmission line through the booster units, where it is rectified into direct current, and this direct current flows into the trolley line and distributing system to supply additional current to meet the demand made on the line for current and this additional current boosts the voltage in the line and the distributing system by preventing the drop in voltage which would otherwise be experienced. When the voltage in the line and the distributing system rises again to normal, the flow of current from the transmission line through the booster system immediately ceases and is discontinued until the voltage in the trolley line again drops, when current immediately commences to flow through the booster system again. Thus the action of the booster system is entirely automatic and requires no attendance or supervision except occasional inspection.

The essential characteristics of a cell of the booster system are a suitable electrolyte to form the current resisting film on one electrode to resist the flow of current in one direction only, and another electrode which is not affected by the electrolyte. Cells of this character, properly grouped, with the specific electrolyte and electrodes hereinbefore described, will rectify alternating currents into direct current, will act as an electrical check valve, as described, and will permit current to flow through it in one direction. It also has the property of discharging excessive voltage current which punctures the film, but the film will reform, or reseal, after such a discharge under the influence of the normal voltage current. Its principal advantage, however, as an element of a booster system is due to the fact that units composed of such cells do not supply rectified current at constant voltage but the voltage of the rectified current supplied decreases as the amount of current supplies increases, so that when a trolley car passes a booster substation connected to the trolley line and distributing system, the booster substation does not have to take the whole electrical load as a transformer or converter substation having transformers or converters provided with movable parts has to when a car passes such a substation, but such an amount of the electrical load as the booster substation has been designed to take, the remainder of the electrical load being taken by the transformer or converter substations, which have transformers or converters provided with movable parts, connected to the trolley line and distributing system.

What I claim is:

1. In a booster system, the combination with an alternating current transmission line of a direct current line, a transformer or converter, having movable parts, electrically connected with both of said lines, and an electrolytic rectifier electrically connected with both of said lines.

2. In a booster system, the combination with an alternating current transmission line of a direct current line, a transformer or converter, having movable parts, electrically connected with both of said lines, and an electrolytic rectifier electrically connected with both of said lines and including an electrolyte, an electrode acted upon by said electrolyte to form a current resisting film to resist the flow of current in one direction only, and an electrode not acted upon by said electrolyte.

3. In a booster system, the combination with an alternating current transmission line of a direct current line, a transformer or converter, having movable parts, electrically connected with both of said lines, and an electrolytic rectifier electrically connected with both of said lines consisting of a unit composed of an electrolyte, a plurality of electrodes acted upon by the electrolyte to form current resisting films to resist the flow of current in one direction only and a plurality of electrodes not acted upon by the electrolyte, the direct current lines being connected with the same kind of electrodes of one pair of cells and with the other kind of electrodes of another pair of cells, and the alternating current lines being connected with both kinds of electrodes of different cells.

In witness whereof I hereto affix my signature in presence of two witnesses.

FREDERICK W. WALKER.

Witnesses:
 CHAS. L. GOSS,
 ALICE E. GOSS.